E. E. KELLER.
SPEED CHANGING MECHANISM.
APPLICATION FILED NOV. 14, 1905.
942,910.
Patented Dec. 14, 1909.
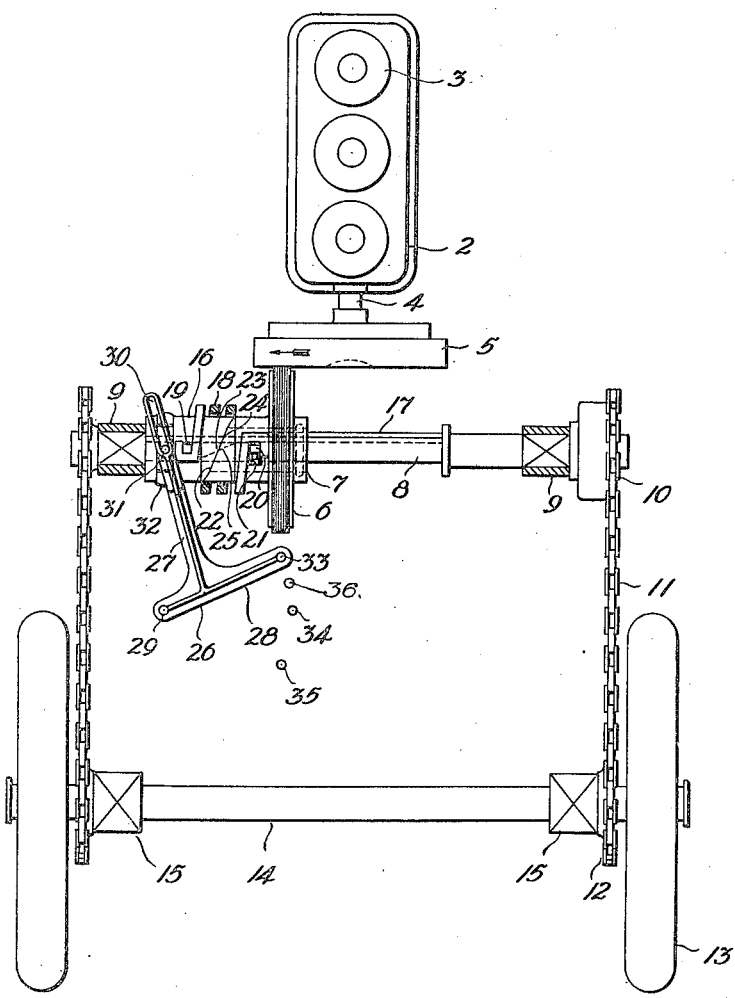
WITNESSES:
G. L. Ryder.
E. W. McCallister
INVENTOR
Emil E. Keller.
BY
Jno. S. Gruen.
ATTORNEY

UNITED STATES PATENT OFFICE.

EMIL E. KELLER, OF PITTSBURG, PENNSYLVANIA.

SPEED-CHANGING MECHANISM.

942,910.  Specification of Letters Patent.  Patented Dec. 14, 1909.

Application filed November 14, 1905. Serial No. 287,312.

*To all whom it may concern:*

Be it known that I, EMIL E. KELLER, a citizen of the United States, and a resident of Pittsburg, in the county of Allegheny and State of Pennsylvania, have invented a new and useful Improvement in Speed-Changing Mechanisms, of which the following is a specification.

This invention relates to speed-changing mechanism.

The object of this invention is the production of a speed - changing mechanism in which automatic means are utilized for varying the torque or purchase of the mechanism in accordance with the resistance encountered, that is, if the load on a machine receiving power from a motor or power shaft through the speed-changing mechanism, becomes too heavy or great for a certain speed of the machine, the speed-changing mechanism will automatically shift or change from a high to a lower speed with a greater torque or purchase, so that if the power received from the motor or shaft be insufficient for the high speed it will be rendered effective and sufficient for the lower speed, or if the power delivered by the motor or power shaft be in excess of that required by the machine while running at a low speed, the speed - changing mechanism will automatically shift or change from the lower speed to a higher speed with a smaller torque or purchase.

The torsional resistance encountered in the driving mechanism of a machine is substantially the same whether the machine is running fast or slow, and it is therefore almost directly proportional to the resistance encountered by the machine in performing its work. For this reason a torsionally controlled speed-changing mechanism will effectively operate for all speeds of the machine and the effort of the engine or power shaft will be practically constant for the ordinary resistances encountered. My invention is therefore particularly adapted for use in connection with the transmission gearing of automobiles, motor cars or locomotives, and when applied to such machines or vehicles insures an economical and efficient performance of the engine or motor in overcoming the different road resistances.

In the further description of my inven-
tion, I will consider it as applied to the transmission mechanism of a motor car, without any idea of limiting its application to such a machine, or even to vehicles.

In the single sheet drawing accompanying this application, a somewhat diagrammatic view of a motor-car transmission gear embodying this invention is shown.

An engine 2, which is provided with three vertical cylinders 3, operates a power shaft 4 on which a combination fly-wheel and friction disk 5 is rigidly mounted. Meshing with the disk 5 is a friction wheel 6, which forms a part of the automatic speed-changing mechanism and which is rigidly mounted on a sleeve 7, which is rotatably mounted on a driving shaft 8. The driving shaft 8 is journaled in bearings 9, and is provided at either end with rigidly mounted driving sprockets 10, which drive through chains 11 and sprockets 12 the driving wheels 13 of the motor car. The wheels 13 are suitably mounted on an axle 14, which is provided with suitable bearings 15.

The automatic controlling device consists of a sleeve 16 mounted on the driving shaft 8 by a feather-way connection 17 in such a manner that while it is capable of driving the shaft 8 through the feather-way connection it is also capable of longitudinal motion along the shaft. The sleeve 7, which is rotatably mounted on the shaft 8, and on which the friction wheel 6 is mounted, is connected to the sleeve 16 by a helical spring 18, which is connected to the respective sleeves 16 and 7 by lugs 19 and 20. The lug 20 on the sleeve 7 is provided with an adjusting screw 21 for varying the tension of the helical spring 18. The sleeve 16 is provided at one end with inclined surfaces 22 and 23, which are held by the spring 18 in contact with corresponding surfaces 24 and 25 of the sleeve 7. A bell crank 26 is provided with arms 27 and 28, and is pivotally mounted at 29 on the frame portion of the motor car. The arm 27 is provided with a slot 30 in which a trunnion 31, rigidly mounted on a collar 32 which is rotatably mounted on the sleeve 16, operates. The arm 28 is adapted to be connected to a suitable manually operated lever, not shown, and by swinging about the pivotal connection 29 reciprocates the sleeve 16, and consequently the sleeve 7 and the friction wheel 6. Suitable means are utilized for locking the arm 28 in the positions 33, 34 and 35, which may be respectively designated as the ahead, neutral and reversing positions.

When the bell crank is in the ahead position, and the spring 18 is under normal tension, the inclined faces of the sleeves 16 and 7 are in their normal relative positions, and the friction wheel 6, by contacting with the friction disk 5 near its outer circumference, drives the car at the maximum speed. By moving the bell-crank 26 to the neutral position, the wheel 6 is moved across the face of the disk 5 until it reaches its center and the car is gradually slowed down until it stops. By moving the bell crank to the reversing position, the wheel is moved past the center of the disk 5, and consequently the car is driven in the opposite direction. These changes of position of the speed-change wheel 6 would be difficult and practically impossible to make if the fly-wheel disk 5 were at rest, but while the engine is running and the disk revolving the wheel 6 may be moved with ease to any position along the shaft 8.

The automatic regulation of the apparatus depends on the fact that, with the road conditions remaining the same and with the motor car well under way, the pull or resistance to motion offered by the back wheels is substantially the same whether the vehicle is moving fast or slow; that is, the pull on the chain in driving the car will be the same, within close limits, whether the vehicle is climbing a hill at a high speed or at slow speed. The engine, however, will expend more power in propelling the car up a given grade through the high speed than it will in propelling it up the same grade through the low speed. The total work expended on the car is the same in each case, but the time in which the work is done varies.

Since the horse-power delivered by an engine is dependent on the number of revolutions of the fly-wheel in conjunction with certain other constant factors, it is readily seen that an engine of ten horse power as a maximum might drive the motor car up a given grade through the low-speed position of the wheel 6 where it would require an engine of probably twice the horse power to accomplish the same feat through the high speed position. A simple illustration of this is the simple lever in which a certain load may be raised through a unit length by a small force acting at the end of a long force arm, or the same result may be accomplished and the same work done by applying twice the force at the end of a lever arm half as long. The only difference is that the small force moves through twice the distance that the force of twice the strength must move, or the fly-wheel of the ten horse power engine will make twice as many revolutions as the twenty horse power engine while driving the car up the grade.

The ordinary gas or gasolene engine does not operate efficiently under varying loads, and it is impossible to efficiently overload them, since an overload slows down the engine and consequently decreases the power delivered. For this reason my invention is particularly applicable to motor car work, and with its use the load on the engine is kept practically constant by varying the speed of the vehicle, or it might be said, by varying the load arm, through which the effort of the engine is delivered to the car, in accordance with the varying resistances encountered.

The spring 18 is designed to sustain, with little or no distortion, a pull of the back wheels which the engine can efficiently overcome while operating through the high speed position of the friction wheel 6, but for all greater resistances offered by the driving wheels the spring will stretch proportional amounts.

The operation of the apparatus is as follows: Let it be supposed that the motor car is already under way, the arm of the bell-crank lever 26 locked into the ahead position 33, the road resistance encountered slight, and consequently the pull of the back wheels on the chain small, the spring 18 is undistorted and the sleeves 16 and 7 are therefore held in their normal relative positions. Now suppose the car strikes a grade or stretch of soft or muddy road, causing the road resistance to increase a noticeable amount which increases the pull of the driving wheels past the predetermined pull for which the spring 18 is designed. As the spring starts to give, the driving shaft 8 and the sleeve 16 lag behind the sleeve 7, and since the contacting surfaces of the sleeves are inclined, and since the sleeve 16 is locked in place on the shaft by the bell crank 26, the inclined face 24 of the sleeve 7 will ride up the inclined face 22 of the sleeve 16 and move the sleeve 7 longitudinally along the shaft 8, thereby causing the friction wheel 6 to move across the face of the disk 5 toward its center. Under these conditions the speed of the car will decrease since the load arm of the transmission gearing is decreased. As the road resistance decreases and the pull of the back wheel lessens, the spring 18 will pull the sleeve 7 back to its normal position and the wheel 6 moving across the face of the disk 5 will accelerate the car. It is readily seen that with such an arrangement the load on the engine is kept practically constant while the speed of the motor car varies with the road resistance. In reversing the car the spring 18 is not brought into action, as the reverse motion of the wheel 6 causes the face 25 of the sleeve 7 to contact with the face 23 of the sleeve 16. The friction wheel 6 may be readily set at any position relative to the face of the disk while the car is in motion since the automatic action of the speed change is dependent on a system of balanced forces existing wholly within the speed-changing device. The pull of the back wheels is balanced by the tension of the spring and the pressure of the face 24 is balanced by the pressure of the face 22. In starting the car, after the engine 2 is running the bell-crank 26 is moved from the stop position 34 toward the ahead position 33 and the spring 18 is immediately elongated a definite amount corresponding to the friction of rest of the car and the road resistance encountered. This elongation of the spring, instead of moving the wheel 6, which in fact is very near the center of the disk 5, forces the sleeve 16 longitudinally along the shaft 8 in the direction of the ahead position; after the spring has stretched a definite amount corresponding to the encountered resistance, the bell crank and the speed change apparatus can be readily moved to any desired position. In stopping the car the same conditions will be encountered; that is, the spring 18 will remain extended until the disk 6 is relieved of the load of the car.

The bell-crank 26 may be provided with one or more additional stop positions 26, so located that for a corresponding position of the sleeve 16 the speed of the car will be limited; that is, with the arm 28 of the bell-crank 26 locked in the position 36, the wheel 6 cannot contact with the outer portion of the disk 5, and consequently the car will not be driven at a high speed. The load on the engine, however, will be kept constant, as the spring 18 will distort in accordance with the varying resistances and reciprocate the wheel 6 across a portion of the disk 5.

It is obvious that many variations and changes in the details of construction will readily suggest themselves to persons skilled in the art, and still fall within the scope and spirit of this invention, and that many of the features shown and described may be omitted or used either alone or in association with others not shown or described. The invention, therefore, is not limited or restricted to the exact details of construction or arrangement shown and above set forth; but Having set forth the object of this invention and a form of construction embodying the principle thereof, and having described such construction, the function and mode of operation, what is claimed as new and useful and sought to be secured by Letters Patent is:

1. In combination with a motor-driven shaft, a shaft to be driven therefrom, a friction gear device between said shafts and means movable longitudinally of the shaft to be driven and the operation of which is dependent upon the torque encountered for varying the speed ratio of said friction gear device.

2. In combination with a motor-driven part, a shaft to be driven therefrom, a friction gear device between said shafts, torque-responsive means mounted on the driven shaft and movable longitudinally thereof for varying the speed ratio of said device and manually-operated means for limiting the operation of said torque-responsive means.

3. In combination in a speed change mechanism, a driving part comprising a friction wheel, and a driven part comprising a rotatable shaft, a sleeve secured thereto, a friction disk coöperating with said wheel and loosely mounted on said shaft, and a driving connection between said disk and said sleeve.

4. In a speed change mechanism, a driving member having a friction face, a driven element having a friction face, a rotatable shaft upon which said driven element is loosely mounted, a yielding connection between said shaft and said element and means whereby said element is moved longitudinally of said shaft under the restraint of said connection.

5. In a speed change device, a driving friction member, a rotatable shaft, a rotatable separable member, a portion of which is feathered to said shaft and a portion of which is free to revolve independently of said shaft, a yielding driving connection between the portions of said separable member and means for locking the feathered portion of said member in different positions along said shaft.

6. In a speed change device, a driving friction disk, a rotatable shaft, a friction member provided with a hub portion loosely mounted on said shaft and a driving connection between said shaft and said member comprising an element feathered to said shaft and provided with an inclined face against which a portion of the hub of said member is adapted to rest and a spring connected to said hub portion and surrounding said element.

7. In a speed change device, a driving friction disk provided with a centrally located depression, a rotatable shaft, a longitudinally extensible device mounted on said shaft comprising a portion feathered to said shaft and a portion free to revolve independently of said shaft and carrying a friction member coöperating with said friction disk, a spring connecting said portions and means for moving said device to different positions along said shaft.

8. In combination with the motor and driving wheels of an automobile, a driven shaft, a driving connection between said shaft and said wheels, a speed change device comprising a friction member driven from said motor, a friction element rotatably mounted on said shaft, a device feathered to said shaft and means employing a yielding driving connection between said element and said shaft whereby the effective turning movement of said speed change device is varied as the torque on said driving wheels varies.

9. In combination with the motor and driving wheels of an automobile, a rotatable shaft from which said driving wheels are driven, a friction speed change device between said motor and said shaft comprising a friction member driven by said motor, a friction element mounted on said shaft and capable of movement independent of said shaft around and lengthwise thereof, a member slidably mounted on said shaft and positively rotated therewith, a spring connecting said member and said element and manually-operated means for sliding said slidable member to different positions on said shaft.

10. In combination with a motor driven shaft, a member to be driven therefrom, a friction gear device between said shaft and said member and means the operation of which is dependent upon the torque encountered by said member for automatically varying the effective turning moment of said shaft and mechanism coöperating with said automatic means for manually operating said gear device.

11. In combination in a speed change device, a driving part comprising a friction wheel, a driven part comprising a rotatable shaft, a friction disk loosely mounted on said shaft and coöperating with said wheel, a sleeve feathered to said shaft and movable longitudinally therealong, a yielding connection between said disk and said sleeve whereby said sleeve is permitted to lag behind said disk in transmitting power to said shaft, and to thereby move said disk across the face of said wheel to vary the effective turning moment of said device, and means for manually moving said sleeve along said shaft.

In testimony whereof, I have hereunto subscribed my name this tenth day of November, 1905.

EMIL E. KELLER.

Witnesses:
DAVID WILLIAMS,
J. L. HALL.